United States Patent
Hippelainen

(10) Patent No.: US 7,302,702 B2
(45) Date of Patent: Nov. 27, 2007

(54) INTERCEPTION METHOD AND SYSTEM

(75) Inventor: Lassi Hippelainen, Helsinki (FI)

(73) Assignee: Nokia Corporation, Espoo (FI)

( * ) Notice: Subject to any disclaimer, the term of this patent is extended or adjusted under 35 U.S.C. 154(b) by 416 days.

(21) Appl. No.: 09/901,814

(22) Filed: Jul. 10, 2001

(65) Prior Publication Data

US 2002/0078384 A1 Jun. 20, 2002

Related U.S. Application Data

(63) Continuation of application No. PCT/EP99/00180, filed on Jan. 14, 1999.

(51) Int. Cl.
*H04L 12/26* (2006.01)

(52) U.S. Cl. .............. 726/13; 726/14; 726/22

(58) Field of Classification Search ........... 713/201, 713/200, 160; 380/247–280; 455/405, 410; 726/1–36

See application file for complete search history.

(56) References Cited

U.S. PATENT DOCUMENTS

| | | | | | |
|---|---|---|---|---|---|
| 4,594,706 | A | * | 6/1986 | Kobayashi | 370/445 |
| 4,797,880 | A | * | 1/1989 | Bussey et al. | 370/411 |
| 4,965,804 | A | * | 10/1990 | Trbovich et al. | 713/153 |
| 5,428,667 | A | | 6/1995 | Easterling et al. | |
| 5,515,376 | A | * | 5/1996 | Murthy et al. | 370/402 |
| 5,710,971 | A | * | 1/1998 | Armbruster et al. | 455/12.1 |
| 5,896,499 | A | * | 4/1999 | McKelvey | 713/201 |
| 5,913,161 | A | * | 6/1999 | Ozulkulu et al. | 455/405 |
| 6,122,499 | A | * | 9/2000 | Magnusson | 455/405 |
| 6,138,162 | A | * | 10/2000 | Pistriotto et al. | 709/229 |
| 6,173,311 | B1 | * | 1/2001 | Hassett et al. | 709/202 |

(Continued)

FOREIGN PATENT DOCUMENTS

WO WO 96/21982 7/1996

(Continued)

OTHER PUBLICATIONS

ETSI Standard ES 201 158 v1.1.2:."Telecommunications Security; Lawful Interception (LI); Requirements for network functions" © 1998 ETSI.*

(Continued)

*Primary Examiner*—Kim Vu
*Assistant Examiner*—Thomas Gyorfi
(74) *Attorney, Agent, or Firm*—Squire, Sanders & Dempsey L.L.P.

(57) ABSTRACT

An interception method and system for performing a lawful interception in a packet network such as the GPRS or UMTS network is described. A first network element having an intercepting function for intercepting data packets is provided, said interception function being controlled by an interception control means implemented in a second network element, wherein an intercepted data packet is transmitted from the first network element via the packet network to an interception gateway element providing an interface to a intercepting authority. The intercepted data packet is transmitted via a secure tunnel provided by an encryption processing. The interception control means and the interception gateway element may both be integrated in the second network element. The interception system has a clear advantage in scalability, no single point of failure, and an adaptation to different authority interfaces can be implemented only in the interception gateway. The network elements can be similar to a high extent for all different authority requirements.

31 Claims, 4 Drawing Sheets

U.S. PATENT DOCUMENTS

| | | | |
|---|---|---|---|
| 6,253,321 B1 * | 6/2001 | Nikander et al. | 713/160 |
| 6,449,282 B1 * | 9/2002 | Loher | 370/447 |
| 6,473,798 B1 * | 10/2002 | Grosser et al. | 709/224 |
| 6,557,037 B1 * | 4/2003 | Provino | 709/227 |
| 6,577,865 B2 * | 6/2003 | Dikmen et al. | 455/433 |
| 6,654,589 B1 * | 11/2003 | Haumont | 455/67.11 |
| 6,771,597 B2 * | 8/2004 | Makansi et al. | 370/230 |
| 2002/0051457 A1 * | 5/2002 | Eloranta | 370/401 |
| 2003/0005331 A1 * | 1/2003 | Williams | 713/201 |
| 2003/0037235 A1 * | 2/2003 | Aziz et al. | 713/160 |

FOREIGN PATENT DOCUMENTS

| | | |
|---|---|---|
| WO | WO 97/42784 | 11/1997 |
| WO | WO 98/52337 | 11/1998 |

OTHER PUBLICATIONS

Matthew J. Burdick; "Continuous Monitoring of Remote Networks: The RMON MIB", Hewlett-Packard Journal, vol. 44, No. 2, Apr. 1993, pp. 82-89.

Mary Jander; "Mainframe Consoles Get Token Ring Data", Data Communications, vol. 21, No. 1, Jan. 1992, pp. 97.

Doris Kopke; "Dem Netz auf die Finger geschaut/Net-Recording und Monitoring machen Ethernet-Netze sicher", vol. 42, No. 6, Mar. 23, 1993, pp. 84-88.

International Search report for PCT/EP99/00180.

* cited by examiner

INTERCEPTION METHOD AND SYSTEM

This application is a continuation of international application serial number PCT/EP99/00180, filed 14 Jan. 1999.

FIELD OF THE INVENTION

The present invention relates to an interception method and system for performing a lawful interception in a packet network such as the GPRS (General Packet Radio Services) or the UMTS (Universal Mobile Telecommunications System) network.

BACKGROUND OF THE INVENTION

The provision of a lawful interception is a requirement of national law, which is usually mandatory. From time to time, a network operator and/or a service provider will be required, according to a lawful authorization, to make available results of interception relating to specific identities to a specific intercepting authority or Law Enforcement Agency (LEA).

There are various aspects of interception. The respective national law describes under what conditions and with what restrictions interception is allowed. If an LEA wishes to use lawful interception as a tool, it will ask a prosecuting judge or other responsible body for a lawful authorization, such as a warrant. If the lawful authorization is granted, the LEA will present the lawful authorization to an access provider which provides access from a user's terminal to that network, to the network operator, or to the service provider via an administrative interface or procedure. When a lawful interception is authorized, an Intercept Related Information (IRI) and the content of the corresponding communication is delivered to the LEA.

In particular, the lawful authorization may describe the IRI and the content of the communication that are allowed to be delivered for this LEA, investigation, period and interception subject. For different LEAs and for different investigations, different constrains can apply that further limit the general borders set by the law. The interception subject may also be described in different ways in a lawful authorization, e.g. subscriber address, physical address, services etc.

Such a lawful interception functionality is also needed in the packet switched part of new mobile data networks such as the GPRS and the UMTS.

Lawful interception is based on an EU Council resolution, which concerns all telecommunications systems, not only mobile ones. The European Telecommunications Standards Institute (ETSI) has defined further technical requirements. These requirements define three interfaces:

X1: administrative tasks (may be on paper or fax)
X2: network signaling (near real time)
X3: intercepted user data (near real time)

The interface X1 carries interception requests, authorization documents, encryption keys and the like. The exact definitions of the three interfaces are left to local legislation and authorities.

Several approaches have been proposed so far. According to a hub approach, a hub is added to the GPRS backbone, such that all sessions will pass through the hub. The benefit of the system is that the SGSN (Serving GPRS Support Node) and the GGSN (Gateway GPRS Support Node) does not have to know anything about the lawful interception functionality. The hub consists of a pseudo GGSN interface and a pseudo SGSN interface, between which a Lawful Interception Node (LIN) is arranged.

However, a drawback of this approach is scalability. The LIN must be able to process all data packets in the backbone. Moreover, it constitutes a single point of failure. If the LIN crashes, the whole network will halt. Therefore, the LIN will be very expensive, probably the most expensive element in the whole network.

FIG. 1 shows a principle block diagram of another so-called SGSN/GGSN approach, where the whole interception function is integrated into a combined SGSN/GGSN element. Every physical SGSN/GGSN element is linked by an own X1 interface to an administrative function.

According to FIG. 1, the access method for delivering a GPRS interception information is based on a duplication of packets transmitted from an intercepted subscriber via the SGSN/GGSN element to another party. The duplicated packets are sent to a delivery function for delivering the corresponding IRI and content of communication to the LEA.

If there are several SGSN/GGSN elements, this system does not have a single point of failure. Moreover, it is scalable in the sense that new lawful interception capacity can be installed with every addition of new SGSN/GGSN elements to the backbone. However, with every installation of new SGSN/GGSN elements, new interfaces to the administrative function are required and there is no natural growth path to the UMTS.

SUMMARY OF THE INVENTION

It is an object of the present invention to provide a flexible and scalable interception method and system.

This object is achieved by an interception method for performing a lawful interception in a packet network, comprising the steps of:
providing a first network element having an interception function for intercepting data packets;
controlling the interception function by an interception control means implemented in a second network element; and
transmitting an intercepted data packet from the first network element via the packet network to an interception gateway element providing an interface to at least one intercepting authority.

Additionally, the above object is achieved by an interception system for performing a lawful interception in a packet network, comprising:
a first network element having an interception function for intercepting data packets and comprising a transmitting means for transmitting an intercepted data packet to the packet network;
an interception control means implemented in a second network element and controlling the interception function; and
an interception gateway element having a receiving means for receiving the intercepted data packet and an interface means for providing an interface to at least one intercepting authority.

Accordingly, the interception control and gateway functionalities can be removed from the network elements that process user data. Thereby, the following advantages can be achieved.

The system is easily scalable, because new LIN capacity can be added as the load increases. Therefore, the LINs themselves are comparable to personal computers. Moreover, the interception gateway function can be distributed over several units, wherein several tunnels can be established from one LIN without adding hardware to it. In the same manner, the interception function controlled by the interception control means implemented in the second network element may send the intercepted data packet to another network element or a plurality of other network elements.

If an LIN fails, some interception functions may not be available, but the network is still able to work. Even the failure of the LIG does not hold the network. The LINs and LIG are practically hot swappable, i.e. they can be replaced without interrupting the operation of the network.

Furthermore, new network elements such as a point-to-multipoint service center or a multimedia messaging service center may be added to the network. However, this does not require new lawful interception functions to be integrated thereinto. The same holds for UMTS nodes, even though they may require more powerful processors due to higher bandwidths. Thus, the same back bone will simultaneously support both GPRS and UMTS, such that the growth to third generation systems is simplified.

Since only the LIG comprises the Xn interfaces to the LEA, it can act as a mediation device towards different LEA requirements. When the requirements change, only the LIG needs to be reprogrammed. The LIG and/or the LIN might even be sold as separate customizable products to other (non-mobile) IP networks.

The interception gateway element may also be integrated in the second network element.

Preferably, the header of a data packet is read by the first network element and data packets to be intercepted are duplicated. The intercepted data packet may be transmitted to the interception gateway element using a secure tunnel which may be implemented by an encryption processing. Thereby, no separate transmission lines are required which would be vulnerable to physical attacks by the operator's personnel.

In case the first network element and the interception gateway element are arranged in separate network segments, the intercepted data packet can be transmitted via interworking units and encrypted between the interworking units.

Preferably, one first network element having the intercepting function is provided in each network segment of the mobile packet network.

Furthermore, received intercepted data packets are collected in the interception gateway element and supplied to an interface of the at least one intercepting authority. The interface may comprise a first interface for administrative tasks, a second interface for network signaling, and a third interface for intercepted user data.

The intercepting function of the first network element may comprise a packet sniffing and filtering function. In particular, the intercepting function may be implemented in the Gn interface excluding any transmission. In detail, the interception function may comprise reading data packets, analyzing the header of the data packets as to whether the data packet should be intercepted or not, and transmitting the data packet to the interception gateway element, and a management function for interception and transmission criteria.

Preferably, an alarm may be transmitted to the interception gateway element and all interception information of the respective first network element may be deleted, when a breakage of a casing or another malfunction of the first network element has been detected. Thereby, an unwanted access to the interception data can be prevented.

Moreover, fake packets can be transmitted from the first network element to the interception gateway element. The fake packets can be transmitted at random or triggered at any passing packet. This can be done in such a manner that the total load of intercepted and fake packets transmitted to the interception gateway element is constant. Thereby, the operating personnel cannot use a timing analysis to detect whose packets are being intercepted. Additionally, the true interception activity cannot be determined, if the load of the intercepted data packets is constant.

Additionally, the intercepted data packets may always be padded to a maximum length, which further obstruses the interception activity.

Preferably, a time stamp may be added to the intercepted data packets. Thereby, the interception information can be stored in a slow or off-line memory before delivery to the intercepting authority, such that real time requirements of the first network element, the interception control means and the interception gateway element and the intercepting authority can be relieved.

The first network element may comprise a reading means for reading a header of a received data packet and for duplicating a data packet to be intercepted. This reading means can be arranged to pad the duplicated data packet to a maximum length.

Moreover, the first network element may be a gateway element such as a BG (Border Gateway), a GGSN (Gateway GPRS Support Node), and a serving node such as an SGSN (Serving GPRS Support Node). In this case, an information on which connections to intercept may preferably be stored in the PDP context information of the respective connections, which is a record used to route the data packets of a connection in a correct manner. Thus, the information on whether or not a data packet needs to be intercepted is readily available each time a packet is being routed.

Thereby, the resources required for the interception function can be minimized.

The first network element may comprise a control means for controlling interception and encryption processing in accordance with an interception setting instruction received from the interception gateway element.

Furthermore, the interception gateway element may comprise a memory means for storing received intercepted data packets before supplying them to the interface means. Moreover, the interception gateway element may comprise a decryption means for decrypting received intercepted data packets, an extraction means for extracting intercepted data packets from fake data packets, and a means for adding the time information to the received intercepted data packets before storing them in the memory means.

The first network element may comprise a detecting means for detecting a breakage of a casing of the first network element, and a signaling means for signaling an alarm to the interception gateway element in response to an output of the detecting means.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

Figure 1:
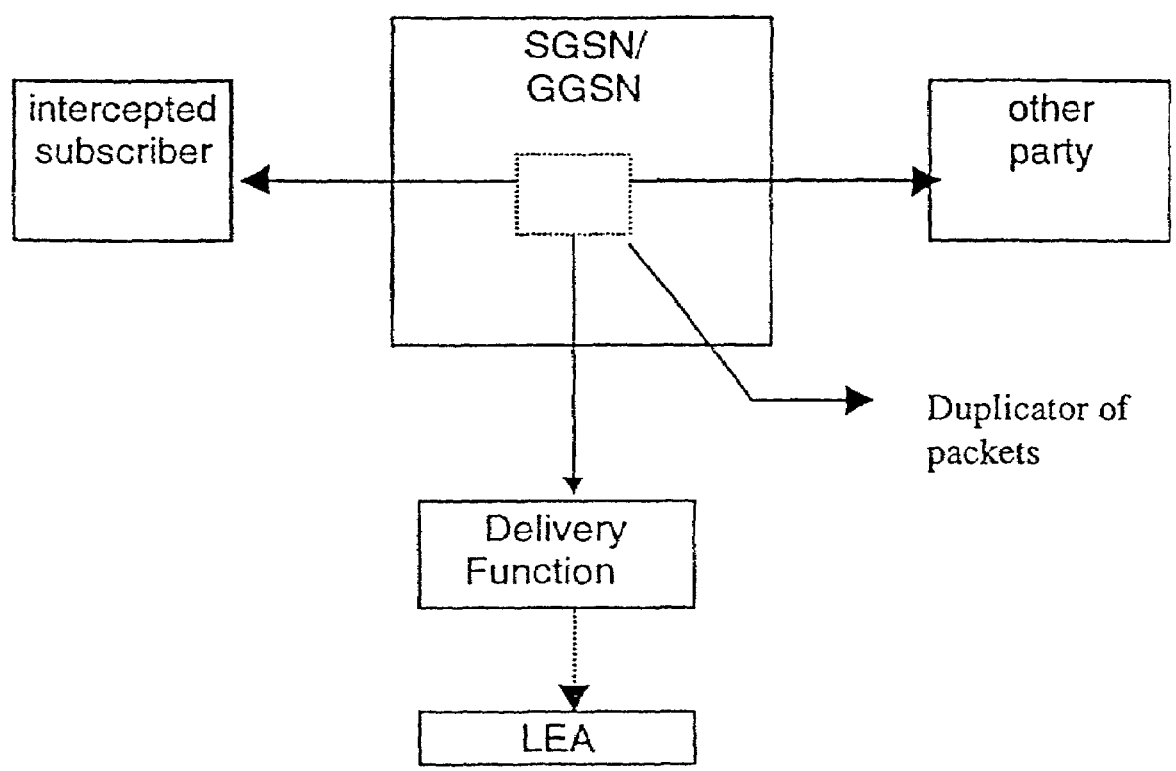
FIG. 1 shows a principle block diagram of a known system for performing a lawful interception.
Figure 2:
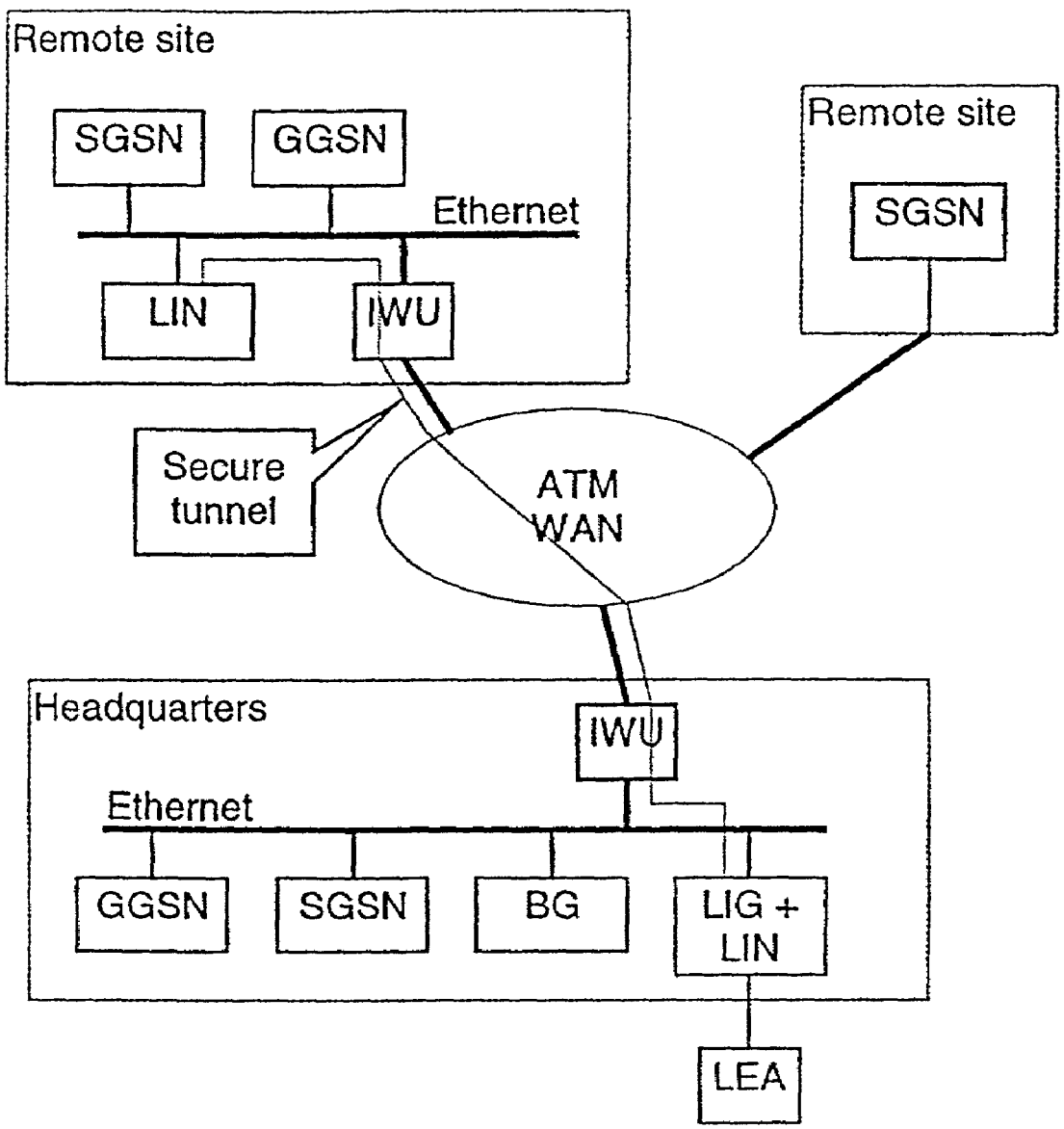
FIG. 2 shows a principle block diagram of a system for performing a lawful interception according to the preferred embodiment of the present invention.

In the following, the preferred embodiment of the method and system according to the present invention will be described on the basis of a mobile packet network such a GPRS or UMTS network, as shown in FIG. 2.

According to FIG. 2, remote sites which may comprise an Ethernet segment or only an SGSN, and a headquarters Ethernet segment are connected to an ATM WAN (Asynchronous Transfer Mode Wide Area Network). Each segment with a GGSN or a BG is equipped with a lawful interception node (LIN) or packet sniffer. The remote stand-alone SGSN does not have to be equipped with an LIN. The LIN not necessarily has to be a separate network element but can be integrated into the same physical unit as the GGSN or the BG.

The LINs are arranged as passive packets sniffers used for reading and duplicating intercepted data packets. Each Ethernet segment must have one LIN, so that all data packets transmitted via the backbone can be intercepted. It is to be noted, that an independent LIN requires a broadcast backbone such as the Ethernet, whereas a LIN implemented by a GPRS support node (GSN) is able to share the sane interface and intercept all data packets. The LIN may be implemented in any GSN, including an SGSN.

Each LIN is arranged as a packet sniffer and filter, essentially a personal computer with an Ethernet interface and a GTP protocol stack. In effect, each LIN may implement a Gn interface as defined in the GSM specification 09.60. In this case, the LIN is arranged as a passive listening node which is able to read the GPRS Tunneling Protocol (GTP). Nevertheless, despite the passive listening function, the LIN is arranged to transmit to the LIG via the same physical interface which also runs the Gn interface, but at a different TCP (Transmission Control Protocol) or UDP (User Datagram Protocol) port.

The data packets intercepted by the LINs are collected by a lawful interception gateway (LIG) which supplies them to the X1, X2 and X3 interfaces of at least one intercepting authority (LEA). In case several LEAs are connected to one LIG, the LEAs may even access the same target connection with different authorizations, i.e. one LEA may only monitor the target connection via the X2 interface, while another LEA performs an interception by using also the X3 interface.

The LINs are configured to intercept at a maximum level. It is thus the task of the LIG to deliver only that part of the intercepted information, which the respective LEA is authorized to receive. In this way, the decision on the kind and destination of the information to be delivered is concentrated at the LIG, such that the structure of the LINs can be kept simple.

Figure 3:
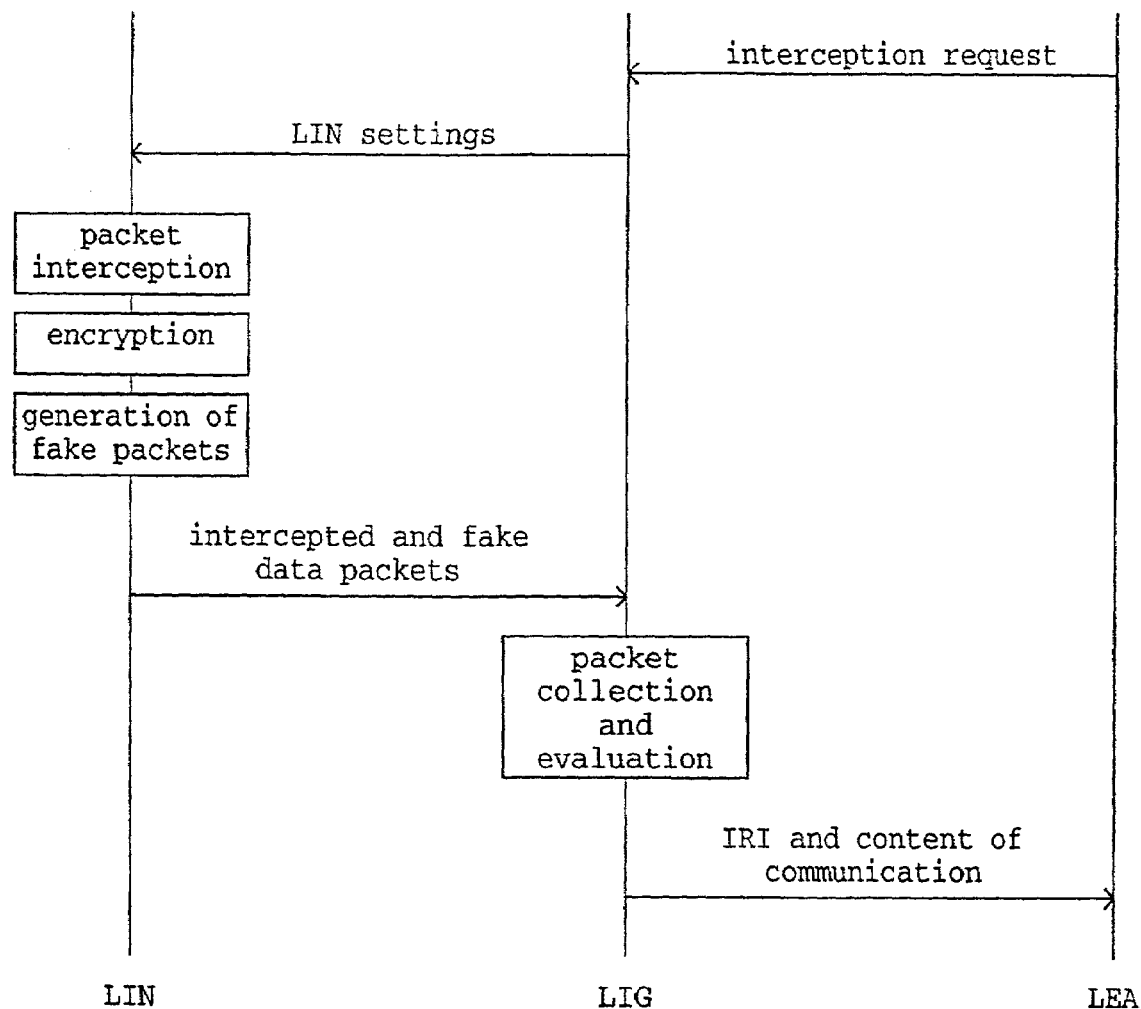
FIG. 3 shows a flow and information transfer diagram of a method for performing a lawful interception according to the preferred embodiment of the present invention.

At the headquarters Ethernet, the corresponding LIN and LIG may integrated in a single network element, as shown in FIG. 3. Alternatively, a separate LIN and LIG may be provided in the Ethernet segment.

A call which is transmitted via the network passes two of three functionalities, i.e. the BG, the GGSN or SGSN. For reasons of economy, it is sufficient to equip each side having a GGSN or BG with an LIN. Thereby, any call can be intercepted.

In the following the method for performing lawful interception according to the preferred embodiment is described with reference to FIG. 3. FIG. 3 shows a flow and information transfer diagram which is to be read from the top to the bottom.

According to FIG. 3, an initial interception request is issued from the LEA to the LIG. In fact, the LEA passes a lawful authorization to the network operator, access provider or service provider. The network operator, access provider or service provider determines the relevant target identities from the information given in the lawful authorization. Then, the network operator, access provider or service provider commands an interception control unit, used for controlling the interception functions of the LINs, to provide a corresponding interception information to the LIN of the relevant target identity. The interception control unit can be arranged in the LEA (as in the case of FIG. 3) or in a separate network element.

Subsequently, the interception control unit transmits the required LIN settings via the packet network to the corresponding LIN. In response to the receipt of the LIN settings, the LIN performs a packet interception and duplicates those packets which are to be intercepted based on their header information. Then, the intercepted packets are encrypted and fake packets are generated and added to the intercepted packets. These encrypted and blurred data packets are transmitted via corresponding interworking units (IWU) through the ATM WAN to the LIG. Due to the encryption processing, a secure tunnel is established, although the intercepted data packets are transmitted via a normal channel of the packet network.

However, it is noted that any other kind of transmission and/or transmission channel can be implemented for transmitting the intercepted data packets in the preferred embodiment, as long as the required security can be established.

At the LIG, the received data packets are collected and evaluated so as to generate the interception related information (IRI) and the content of the intercepted communication, which are finally transmitted via the X3 interface to the LEA.

In the following, the LIN and LIG is described in greater detail with reference to FIG. 4. It is noted that the interworking units IWU according to FIG. 2 are not shown in FIG. 4.

Figure 4:
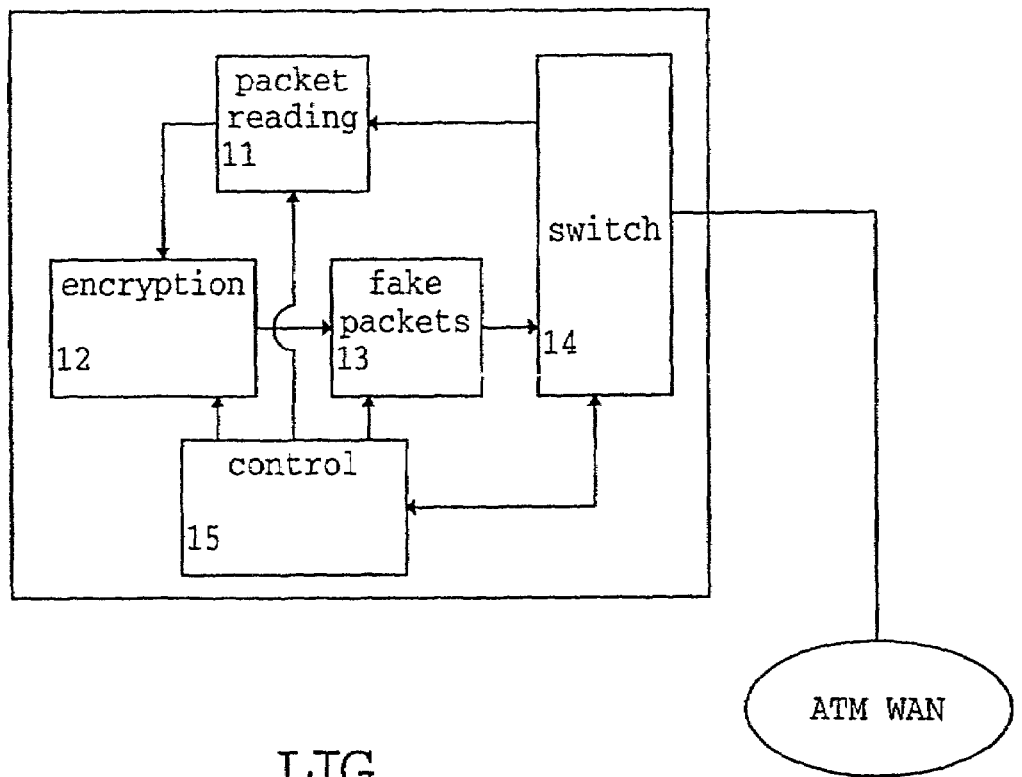
FIG. 4 shows a principle block diagram of an interception node connected via a packet network to an interception gateway according to the preferred embodiment of the present invention.
Figure 4:
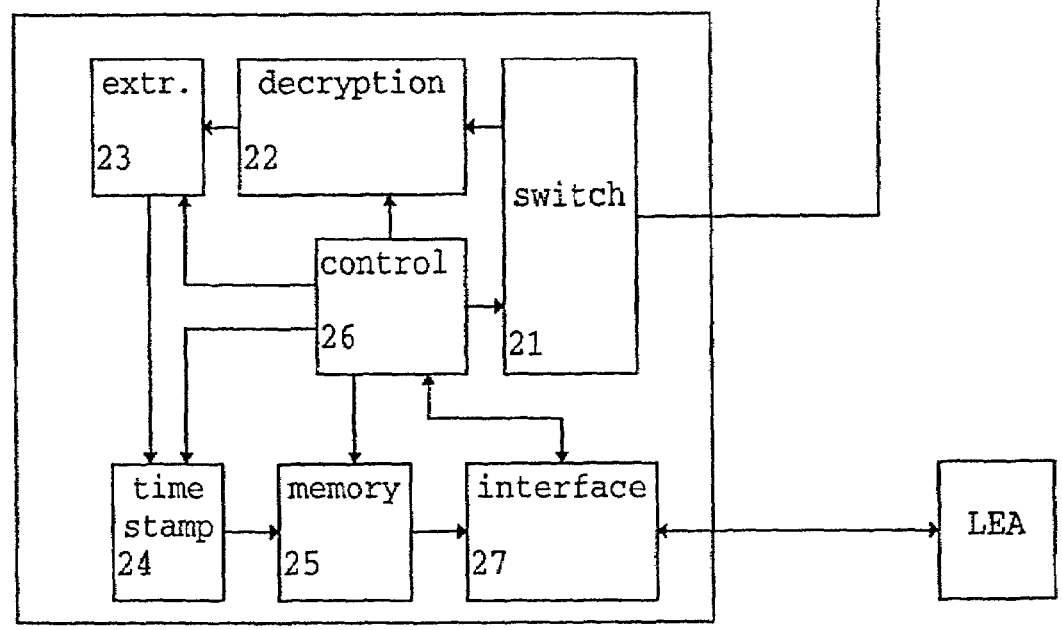

According to FIG. 4, the LIN is arranged to perform the following functions, which may be established either as software elements or as discrete hardware elements.

The LIN comprises a switching means 14 for receiving and transmitting data packets from/to the network and for supplying them to a packet reading means 11 where the header of the extracted data packet is read and analyzed as to whether the data packet should be intercepted or not. The intercepted data packet is supplied to an encryption means 12 arranged to encrypt the data packet to thereby implement a secure tunnel. Additionally, the encrypted data packets may be supplied to a means 13 for adding fake packets to thereby obscure the interception activity. The encrypted and fake data packets are supplied to the switching means 14 in order to be transmitted via the ATM WAN to the LIG. The fake packets may be transmitted at random time or triggered by any passing packet. Moreover, the packet reading means 11 or the encryption means 12 could be arranged so as to pad the intercepted packet to a maximum length.

Furthermore, the control means 15 may perform a control so as to delay the intercepted data packets for a random period, to thereby render it difficult determining who is being intercepted. However, in this case, an additional information defining the actual interception moment or the delay should be added to the data packet transmitted to the LIG.

Generally, a constant load of lawful interception packets should be provided irrespective of the true interception activity. Providing a constant interception load facilitates billing, obviates monitoring of interception traffic, and blurs the true interception activity.

Furthermore, the LIN comprises a control means 15 arranged to control the other means of the LIN on the basis of an interception control information regarding interception criteria and the secure tunnel, which has been received from the interception control unit provided in the LIG or a separate network element via the switching means 14.

Additionally, a detecting means (not shown) may be provided for detecting a breakage of a casing of the LIN. In this case, a signaling means (not shown) may also be provided for transmitting an alarm to the LIG and instructing the control means 15 so as to erase all interception information such as filter settings and the like from an LIN memory (not shown). Moreover, the detecting means may be arranged to also detect other malfunctions of the LIN, such as a power failure or other failures, wherein the signaling means is arranged to issue a corresponding alarm to the LIG.

The LIG is arranged as a master of the LINs and provides a user interface 27 towards at least one LEA. The LIG can be a personal computer, minicomputer or mainframe. In particular, the LIG may be arranged to perform the following functions which may also be implemented as software or hardware elements.

The interface 27 is arranged to provide the Xn interfaces to the at least one LEA, wherein an interface module may be provided for each LEA in case several LEAs are provided. Furthermore, a switching means 21 is provided for receiving intercepted data packets from the ATM WAN via the secure tunnel and for transmitting LIN settings and other control information via the switching means 14 to the control means 15 of the LIN.

Intercepted data packets and fake packets received via the secure tunnel are supplied from the switching means 21 to a decrypting means 22 which is arranged to remove the LIN encryption of the intercepted packets. Furthermore, an extracting means 23 may by provided for removing duplicates and possible fake packets or padding information. The intercepted data packets from which the LIN encryption and duplicates or fake packets have been removed are supplied to a time stamp generating means 24 where a time stamp is added to the intercepted data packets in order to provide a timing reference before storing the intercepted data packets in a memory 25 which constitutes a mass storage for intercepted information.

The time stamp should be added as soon as possible, or it may even have been added already at the corresponding LIN such that the time stamp generating means 24 can be dispensed with. Due to the time stamp, the intercepted information can be stored in the memory 25 before being delivered to the LEA. Thereby, a real time processing is not required.

Furthermore, a control means 26 is provided in the LIG and arranged to control each element of the LIG. The control means 26 may comprise several control units for each LEA interface module of the interface 27. Moreover, the control means 26 may comprise the interception control unit for managing the LIN settings as a master function by transmitting a corresponding control information via a switching means 21 and 14 to the control means 15 of the LIN.

It is to be noted that the location of the LIN is not limited to an LAN segment, but the LIN may by implemented as a part of a GPRS element such as the GGSN or BG itself.

In general, there are two ways to configure the LIN for the interception. One way is to deliver each intercept authorization to every LIN. This means that a complete target register defining target connections for interception is delivered to each LIN. If there are many target connections, the LIN has to check each data packet with respect to all target connections, which is a time consuming task.

A more efficient way to configure the LIN is to store the whole target register only at the interception control unit which, as already mentioned, may be provided in the LIG or another network element. At each PDP context activation, the corresponding LIN transmits a copy of the activation request to the interception control unit which checks its target register as to whether a target connection is involved. If so, it configures the LIN for interception.

At context deactivation or when the intercept request expires, a target is removed from an actual interception list provided in the LIN.

Thus, the interception information controlling the LIN is part of the PDP (Packet Data Protocol) context held by the GPRS network elements and used to route the packets of a connection in a correct manner. The information on the target connections to be intercepted is stored in the PDP context information of the respective connections. The interception information stored in the PDP context is thus readily available each time a packet is being routed. Accordingly, the interception lists of the LINs can be kept very short, which leads to an increased processing speed of the LINs. However, since the contexts have a long lifetime, the interception control unit has to store a register of all active contexts, so that it can check whether a target connection has any open session going on upon receipt of an intercept request from a LEA. If so, the relevant LIN interception list is configured correspondingly.

Moreover, the present invention is not limited to the described GPRS or UMTS network and can be used in various packet networks such as an IP network. Thus, the above description of the preferred embodiment and the accompanying drawings are only intended to illustrate the present invention. The preferred embodiment of the invention may vary within a scope of the attached claims.

In summary, an interception method and system for performing a lawful interception in a packet network such as the GPRS or UMTS network is described. A first network element having an intercepting function for intercepting data packets is provided, said interception function being controlled by an interception control means implemented in a second network element, wherein an intercepted data packet is transmitted from the first network element via the packet network to an interception gateway element providing an interface to a intercepting authority. The intercepted data packet is transmitted via a secure tunnel provided by an encryption processing. The interception control means and the interception gateway element may both be integrated in the second network element. The interception system has a clear advantage in scalability, no single point of failure, and an adaptation to different authority interfaces can be implemented only in the interception gateway. The network elements can be similar to a high extent for all different authority requirements.

The invention claimed is:

1. An interception method for performing a lawful interception in a packet network, comprising:
providing a first network element having an interception function for intercepting data packets;
controlling said interception function by an interception control means implemented in a second network element; and
transmitting an intercepted data packet from said first network element via said packet network to an interception gateway element providing an interface to at least one intercepting authority, wherein said first network element generates fake packets to be transmitted with said intercepted data packets and the fake packets are transmitted from said first network element to said interception gateway element,
wherein said fake packets are transmitted at random or triggered at any passing packet, such that the total load of intercepted and fake packets transmitted to said interception gateway element is constant.

2. A method according to claim 1, wherein said interception gateway element is integrated in said second network element.

3. A method according to claim 1, wherein a header of a data packet is read by said second network element and data packets to be intercepted are duplicated.

4. A method according to claim 1, wherein said intercepted data packet is transmitted to said interception gateway element using a secure tunnel.

5. A method according to claim 4, wherein said secure tunnel is implemented by an encryption processing.

6. A method according to claim 1, wherein said intercepted data packet is transmitted via interworking units and encrypted between said interworking units, when said first network element and said interception gateway element are arranged in separate network segments.

7. A method according to claim 1, wherein said first network element is provided in each network segment of said packet network.

8. A method according to claim 1, wherein received intercepted data packets are collected in said interception gateway element and supplied to an interface of said at least one intercepting authority.

9. A method according to claim 8, wherein said interface comprises a first interface for administrative tasks, a second interface for network signaling, and a third interface for intercepted user data.

10. A method according to claim 1, wherein said intercepting function comprises a packet sniffing and filtering function.

11. A method according to claim 10, wherein said intercepting function is implemented in a Gn interface.

12. A method according to claim 1, wherein said interception function comprises reading data packets, analyzing the header of the data packets as to whether the data packet should be intercepted or not, and transmitting the data packet to said interception gateway element, and a management function for interception and transmission criteria.

13. A method according to claim 1, wherein an alarm is transmitted to said interception gateway element and all interception information of a respective network element is deleted, when a breakage of a casing of the respective network element has been detected.

14. A method according to claim 1, wherein said intercepted data packet is padded to a maximum length.

15. A method according to claim 1, wherein a time information is added to said intercepted data packet.

16. An interception system comprising:
a first network element having an interception function to intercept data packets and comprising a transmitting unit configured to transmit an intercepted data packet to said packet network;
an interception control unit implemented in a second network element and configured to control the interception function; and
an interception gateway element having a receiving unit configured to receive said intercepted data packet and an interface unit configured to provide an interface to at least one intercepting authority,
wherein said first network element further comprises a generating unit configured to generate fake packets to be transmitted with said intercepted data packets, and
wherein said transmitting unit is further configured to transmit said fake packets at random or triggered at any passing packet, such that the total load of intercepted and fake packets transmitted to said interception gateway element is constant,
wherein the interception system is configured to perform a lawful interception in a packet network.

17. A system according to claim 16, wherein said second network element corresponds to said interception gateway element.

18. A system according to claim 16, wherein said first network element further comprises an encrypting unit configured to encrypt said intercepted data packet.

19. A system according to claim 16, wherein said first network element comprises a reading unit configured to read a header of a received data packet and for duplicating a data packet to be intercepted.

20. A system according to claim 19, wherein said reading unit means is configured to pad said copied data packet to a maximum length.

21. A system according to claim 16, wherein said first network element is a gateway element of said packet network.

22. A system according to claim 21, wherein an interception information defining a data packet to be intercepted is included in a context information supplied to said first network element and used for routing data packets.

23. A system according to claim 22, wherein said interception control unit further comprises a storing unit configured to store an interception list, and wherein said interception control unit is configured to add said interception information to said context information supplied to said first network element.

24. A system according to claim 16, wherein said first network element is a border gateway, an serving GPRS support node or a gateway GPRS support node.

25. A system according to claim 16, wherein said first network element is configured in each segment of said packet network.

26. A system according to claim 16, wherein said first network element comprises a control unit configured to control interception and encryption processing in accordance with an interception setting instruction received from said interception control means.

27. A system according to claim 16, wherein said first network element comprises a detecting unit configured to detect a malfunction and/or breakage thereof, and signaling unit configured to signal an alarm to said interception gateway element in response to an output of said detecting unit.

28. An interception system comprising:
- a first network element having an interception function for intercepting data packets and comprising a transmitting unit configured to transmit an intercepted data packet to said packet network;
- an interception control unit implemented in a second network element and further configured to control the interception function; and
- an interception gateway element having a receiving unit configured to receive said intercepted data packet and an interface unit configured to provide an interface to at least one intercepting authority, wherein said interception gateway element comprises a memory unit configured to store received intercepted data packets before supplying them to said interface unit,
- wherein said interception gateway element comprises a decryption unit configured to remove an encryption of the received intercepted data packets, an extraction unit configured to extract intercepted data packets from fake data packets, and an adding unit configured to add a time information to said received intercepted data packets before storing them in said memory unit, and
- wherein said transmitting unit is further configured to transmit said fake packets at random or triggered at any passing packet, such that the total load of intercepted and fake packets transmitted to said interception gateway element is constant,
- wherein the interception system is configured to perform a lawful interception in the packet network.

29. A network element for a packet network, comprising:
- an interception unit configured to intercept a data packet received from said packet network, and
- a transmitting unit configured to transmit said intercepted data packet via said packet network to an interception gateway element,
- wherein said interception unit is controlled by an interception control unit configured in another network element, and said network element further comprises a generating unit configured to generate fake packets to be transmitted with said intercepted data packets and the fake packets are transmitted from said network element to said interception gateway element, and
- wherein said fake packets are transmitted at random or triggered at any passing packet, such that the total load of intercepted and fake packets transmitted to said interception gateway element is constant.

30. An interception gateway element for an interception system of a packet network, comprising:
- a receiving unit configured to receive an intercepted data packet via said packet network from a network element having an interception function;
- an interface unit configured to provide an interface to an intercepting authority;
- a memory unit configured to store received intercepted data packets before supplying them to said interface unit wherein said interception gateway element comprises a decryption unit configured to remove an encryption of the received intercepted data packets, an extraction unit configured to extract intercepted data packets from fake data packets and an adding unit configured to add a time information to said received intercepted data packets before storing them in said memory,
- wherein said receiving unit is further configured to receive said fake packets transmitted at random or triggered at any passing packet, such that the total load of intercepted and fake packets received by said interception gateway element is constant.

31. An interception gateway element according to claim 30, further comprising an interception control unit configured to control said interception function of said network element.

* * * * *